UNITED STATES PATENT OFFICE.

OSCAR GÜNTHER AND LEOPOLD HESSE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

YELLOW AZO DYE.

935,017.     Specification of Letters Patent.     Patented Sept. 28, 1909.

No Drawing.     Application filed May 4, 1909. Serial No. 493,773.

*To all whom it may concern:*

Be it known that we, OSCAR GÜNTHER and LEOPOLD HESSE, doctors of philosophy, chemists, citizens of the German Empire, residing at Elberfeld, Germany, have invented new and useful Improvements in New Dyestuff, of which the following is a specification.

Our invention relates to the manufacture and production of new azo dyestuffs capable of dyeing unmordanted cotton yellow shades fast to light. The process for their production consists in converting carboxylic acids of aminoazo compounds of the benzene series into the symmetrical diarylurea compounds by treatment with phosgen. The new dyes are after being dried and pulverized in the shape of their alkaline salts dark yellow powders soluble in water with a yellow and soluble in concentrated sulfuric acid with a reddish color. Upon reduction with stannous chlorid and hydrochloric acid an amino-carboxylic acid of the benzene series and an urea of a diamin is obtained which is split up into carbonic acid and a diamin.

To illustrate our process we can proceed as follows, the parts being by weight:—586 parts of the sodium salt of the aminoazo dyestuff: meta-aminobenzoic acid + ortho-anisidin are dissolved in 9000 parts of water. Phosgen is introduced into this solution which has to be stirred and kept alkaline until the production of the urea is complete. The new dye is after being dried and pulverized in the shape of its sodium salt a yellow-brown powder soluble in water with a yellow color and soluble in concentrated sulfuric acid with a red color; yielding upon reduction with stannous chlorid and hydrochloric acid meta-aminobenzoic acid and the urea of para-amino-ortho-anisidin which is further decomposed into 2-methoxy-para-phenylenediamin and carbonic acid. It dyes cotton greenish-yellow shades fast to light.

The process is carried out in an analogous manner on using other of the above mentioned aminoazo compounds.

What we claim is.

1. The herein described new dyestuffs being ureas of carboxylic acids of aminoazo compounds obtainable from amino-carboxylic acids of the benzene series and amins which dyes are after being dried and pulverized in the shape of their alkaline salts dark yellow powders soluble in water with a yellow and soluble in concentrated sulfuric acid with a reddish-color; yielding upon reduction with stannous chlorid and hydrochloric acid an amino-carboxylic acid of the benzene series and an urea of a diamin which is further decomposed into carbonic acid and a diamin; dyeing cotton yellow shades, substantially as described.

2. The herein described new dyestuff being the urea of the azo compound obtainable from meta-aminobenzoic acid and ortho-anisidin, which is after being dried and pulverized in the shape of its sodium salt a yellow-brown powder soluble in water with a yellow color and soluble in concentrated sulfuric acid with a red color; yielding upon reduction with stannous chlorid and hydrochloric acid meta-aminobenzoic acid and the urea of para-amino-ortho-anisidin which is further decomposed into 2-methoxy-para-phenylenediamin and carbonic acid; dyeing cotton greenish-yellow shades fast to light, substantially as described.

In testimony whereof we have hereunto set our hands in the presence of two subscribing witnesses.

OSCAR GÜNTHER. [L. S.]
         LEOPOLD HESSE. [L. S.]

Witnesses:
    OTTO KÖNIG,
    C. J. WRIGHT.